(12) United States Patent
Barlow et al.

(10) Patent No.: US 7,203,800 B2
(45) Date of Patent: Apr. 10, 2007

(54) NARROW/WIDE CACHE

(75) Inventors: Stephen Barlow, Conington (GB); Neil Bailey, Histon (GB); Timothy Ramsdale, Cambridge (GB); David Plowman, Great Chesterford (GB); Robert Swann, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/299,264

(22) Filed: Dec. 1, 2005

(65) Prior Publication Data
US 2006/0095681 A1    May 4, 2006

Related U.S. Application Data

(63) Continuation of application No. 10/413,487, filed on Apr. 15, 2003, now Pat. No. 7,028,143.

(51) Int. Cl.
*G06F 12/02* (2006.01)

(52) U.S. Cl. ...................................................... 711/138
(58) Field of Classification Search ................ 711/118, 711/138, 165; 712/4, 225
See application file for complete search history.

(56) References Cited

U.S. PATENT DOCUMENTS

| | | | |
|---|---|---|---|
| 4,638,431 A | * | 1/1987 | Nishimura .................. 711/144 |
| 5,123,095 A | * | 6/1992 | Papadopoulos et al. ..... 712/218 |
| 6,816,960 B2 | * | 11/2004 | Koyanagi ....................... 712/4 |

* cited by examiner

*Primary Examiner*—Kevin L. Ellis
(74) *Attorney, Agent, or Firm*—McAndrews, Held & Malloy Ltd.

(57) ABSTRACT

A method for transferring data, between a first device and second device in a core processor including a data cache, comprising the steps of, when said first device supports wide data transfer, and said transfer of data comprises a data write operation from said first device to said second device, writing said data to the second device without writing the data to said data cache.

19 Claims, 8 Drawing Sheets

| Bit | Field | | |
|---|---|---|---|
| 32 | Rb_V | Immed(0) | |
| 33 | Rb_USX | Immed(1) | |
| 34 | Rb_XY(0) | Immed(2) | |
| 35 | Rb_XY(1) | Immed(3) | |
| 36 | Rb_XY(2) | Immed(4) | If Rb IMM = 1 |
| 37 | Rb_XY(3) | Immed(5) | |
| 38 | Rb_X(4) | Cond(0) | |
| 39 | Rb_X(5) | Cond(1) | |
| 40 | Rb_Y(4) | Cond(2) | |
| 41 | Rb_Y(5) | SETF | |
| 42 | Rb_IMM | | |
| 43 | Ra_XY(0) | | |
| 44 | Ra_XY(1) | | |
| 45 | Ra_XY(2) | | |
| 46 | Ra_XY(3) | | |
| 47 | Ra_X(4) | | |

Half-word 2

| Bit | Field |
|---|---|
| 16 | Ra_X(5) |
| 17 | Ra_Y(4) |
| 18 | Ra_Y(5) |
| 19 | Ra_USX |
| 20 | Ra_V |
| 21 | Rdab_SX(0) |
| 22 | Rdab_SX(1) |
| 23 | Rdab_SX(2) |
| 24 | Rd_XY(0) |
| 25 | Rd_XY(1) |
| 26 | Rd_XY(2) |
| 27 | Rd_XY(3) |
| 28 | Rd_X(4) |
| 29 | Rd_X(5) |
| 30 | Rd_Y(4) |
| 31 | Rd_Y(5) |

Half-word 1

| Bit | Field |
|---|---|
| 0 | Rd_USX |
| 1 | Rdab_16Bi |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=1 |
| 10 | 0 |
| 11 | 0 |
| 12 | 0 |
| 13 | 0 |
| 14 | 0 |
| 15 | 0 |

Half-word 0

Compact 48-bit Encoding

FIG. 7(I)

| Bit | Field | Alt | Condition |
|---|---|---|---|
| 32 | Rb_V | Immed(0) | |
| 33 | Rb_CIRC | Immed(1) | |
| 34 | Rb_XY(0) | Immed(2) | |
| 35 | Rb_XY(1) | Immed(3) | |
| 36 | Rb_XY(2) | Immed(4) | If Rb_IMM = 1 |
| 37 | Rb_XY(3) | Immed(5) | or Rb_IMM2 = 1 |
| 38 | Rb_X(4) | Immed(6) | |
| 39 | Rb_X(5) | Immed(7) | |
| 40 | Rb_Y(4) | Immed(8) | |
| 41 | Rb_Y(5) | Immed(9) | |
| 42 | Rb_IMM | | |
| 43 | Ra_XY(0) | | |
| 44 | Ra_XY(1) | | |
| 45 | Ra_XY(2) | Ra_X(2) | If Ra_SP = 1 |
| 46 | Ra_XY(3) | Ra_X(3) | |
| 47 | Ra_X(4) | | |

Half-word 2

| Bit | Field | Alt | Condition |
|---|---|---|---|
| 16 | Ra_X(5) | | |
| 17 | Ra_Y(4) | | |
| 18 | Ra_Y(5) | | |
| 19 | Ra_CIRC | | |
| 20 | Ra_V | SETF | If Ra_SP = 1 |
| 21 | Rd_SX(0) | | |
| 22 | Rd_SX(1) | | |
| 23 | Rd_SX(2) | | |
| 24 | Rd_XY(0) | | |
| 25 | Rd_XY(1) | | |
| 26 | Rd_XY(2) | | |
| 27 | Rd_XY(3) | | |
| 28 | Rd_X(4) | | |
| 29 | Rd_X(5) | | |
| 30 | Rd_Y(4) | | |
| 31 | Rd_Y(5) | | |

Half-word 1

| Bit | Field |
|---|---|
| 0 | Rd_CIRC |
| 1 | Rd_16BIT |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=0 |
| 10 | 0 |
| 11 | 0 |
| 12 | 0 |
| 13 | 0 |
| 14 | 0 |
| 15 | 0 |

Half-word 0

Full 80-bit Encoding

FIG. 7(II)

| Bit | Half-word 4 | |
|---|---|---|
| 64 | SRU_SX(0) | |
| 65 | SRU_SX(1) | |
| 66 | SRU_SX(2) | |
| 67 | SRU(0) | |
| 68 | SRU(1) | |
| 69 | Rep(0) | |
| 70 | Rep(1) | |
| 71 | Rep(2) | |
| 72 | REPLT | |
| 73 | ACC | |
| 74 | CLRA | |
| 75 | Cond(0) | |
| 76 | Cond(1) | |
| 77 | Cond(2) | |
| 78 | SETF | |
| 79 | – | |

| Bit | Half-word 3 | |
|---|---|---|
| 48 | Rd_++ | |
| 49 | Ra_SX(0) | |
| 50 | Ra_SX(1) | |
| 51 | Ra_SX(2) | |
| 52 | Ra_x++ | |
| 53 | Ra_Y(0) | |
| 54 | Ra_Y(1) | |
| 55 | Ra_y++ | Ra_Y(2) |
| 56 | Ra_16BIT | Ra_Y(3) |
| 57 | Ra_SP | |
| 58 | Rb_++ | Immed(10) |
| 59 | Rb_16BIT | Immed(11) |
| 60 | Rb_SX(0) | Immed(12) |
| 61 | Rb_SX(1) | Immed(13) |
| 62 | Rb_SX(2) | Immed(14) |
| 63 | Rb_IMM2 | Immed(15) |

If Ra_SP = 1
If Rb_IMM = 1
If Rb_IMM = 1 or Rb_IMM2 = 1

FIG. 7(III)

NARROW/WIDE CACHE

CROSS-REFERENCE TO RELATED APPLICATIONS

This application is a continuation of U.S. application Ser. No. 10/413,487 filed Apr. 15, 2003 now U.S. Pat. No. 7,028,143.

The present invention relates to a processor and in particular, but not exclusively, to the transfer of data in the processor.

It is increasingly the case that processors are being purpose built to fulfil the requirements of particular applications. The present invention concerns particularly, but not exclusively, a processor architecture for use in image processing or other multi-media applications.

Existing processor architectures use differing combinations of so-called scalar units and vector units. In the following, a scalar unit implies a unit capable of executing instructions defining a single operand set, that is, typically operating on a pair of source values and generating a destination value for each instruction. A vector unit operates in parallel on a plurality of value pairs to generate a plurality of results. These are often provided in the form of packed operands, that is two packed operands provide a plurality of value pairs, one from each operand in respective lanes.

Existing processor architectures use a scalar processor unit for multi-media processing. However, because there is little or no parallelism in this approach, the processor has to run very quickly. Even if the processor is capable of running quickly, it will be inefficient in terms of power consumption.

Other approaches have considered the coupling of a scalar processor with a vector processing unit. However, it is difficult to establish an architecture in which the advantages of the scalar unit and the vector processing unit can be maximised without placing restrictions on the processor operation. For example, if the vector unit is a separate processor it is difficult to achieve sufficiently tight integration to enable the scalar unit and the vector unit to work efficiently together.

Alternatively, if the vector unit is part of the same processor as the scalar unit, it is difficult to construct a unit with sufficient parallelism but which can communicate intelligently enough with the scalar unit. It is also difficult for the scalar unit to keep the vector unit fed with enough data to achieve significant performance gains.

Another problem which can affect efficiency and power consumption is that no distinction is made between narrow and wide data transfers. A narrow data transfer comprises transferring data in parallel comprising only a few bits such as for example two bits four bits eight bits sixteen bits or thirty-two bits. A wide data transfer in comparison comprises transferring data in parallel comprising sixty-four, one hundred and twenty eight or two hundred and fifty six bits. When a processor makes narrow-access requests for data it tends, during the course of its operation, to re-use those same pieces of data many times over. The data would normally consist of program code and program data. Because of the repeated accesses to this data, it is faster and more power efficient to use a data cache. For this reason a data cache is often provided in the processor.

When the processor makes wide-access requests for data it tends to request those larger chunks of data only at very infrequent intervals. This data consists normally of program data (and not of program code). With this pattern of access it is more efficient not to use a data cache. Furthermore, storing this data in the cache is not only not useful, it is positively detrimental because the large quantities of data involved will cause other data that is usefully held in the cache to be lost. Because of this processors have tended to only use either wide or narrow data transfers. This makes the system inefficient.

It is an aim of the present invention to overcome or at least mitigate such problems.

According to one aspect of the: present invention there is provided a method for transferring data, between a first device and second device in a core processor including a data cache, comprising the steps of: when said first device supports wide data transfer and said transfer of data comprises a data write operation from said first device to said second device, writing said data to the second device without writing the data to said data cache.

Another aspect of the invention provides a core processor comprising: a first device and second device arranged for data transfer between them: a data cache having a plurality of locations arranged to store data therein; and means, when said first device supports wide data transfer and said transfer of data comprises a write operation, arranged for writing said data to the second device from said first device without writing data to said data cache.

In the embodiment which Is described, the semantics of the vector instructions and scalar instructions are flexible enough that a vector instruction can define source values either in the vector unit, in the scalar unit or in a data memory. Moreover, the vector unit can return its results either back to the vector unit itself or to the scalar unit.

This provides flexibly coupled vector and scalar processing units which can communicate effectively with each other to maximise the advantages of each unit.

As will be seen in the following, the organisation of the instructions is such that the instructions most suited to each unit are organised into vector instructions and scalar instructions which are detected at the decode stage and supplied respectively to the appropriate unit for execution. Each vector instruction can identify two source parked operands, each operand containing a plurality of values in respective lanes. In the following, which describes a graphics processor, values are often referred to therein as pixels, because they represent the same.

Embodiments of the present invention solves the problem of marrying up the requirements of wide and narrow transfers. Wide accesses occur usually without using the data cache, whereas narrow accesses do, and sufficient checks are made to ensure that the date remains consistent. Consider the following two examples.

1. A wide-access read request is made to memory. However, a previous operation might have caused that area of memory to be loaded into the cache and modified it there (without flushing it back to memory). The wide-access read simultaneously retrieves the values from memory and checks the cache; if the values are found to be in the cache and dirty (modified), the cached values must be returned instead.

2. A wide-access write is made back to memory. The modified data values are simultaneously returned to memory and a signal sent to the cache to mark the copy of the data in the cache as invalid. If the data is found in the data cache it is marked as invalid; otherwise the data cache does nothing.

Embodiments of the present invention also solve the problem of narrow accesses making efficient use of wide-access devices (by storing the wide-access results of the device in the data cache), and of wide accesses to narrow-access devices (with a block/disassembly unit).

For a better understanding of the present invention, and to show how the same may be carried into effect, reference will now be made by way of example to the accompanying drawings, in which:

FIG. 7 illustrates 48 bit and 80-bit encodings of vector instruction; and

In the drawings like reference numbers refer to like parts.

Figure 1:
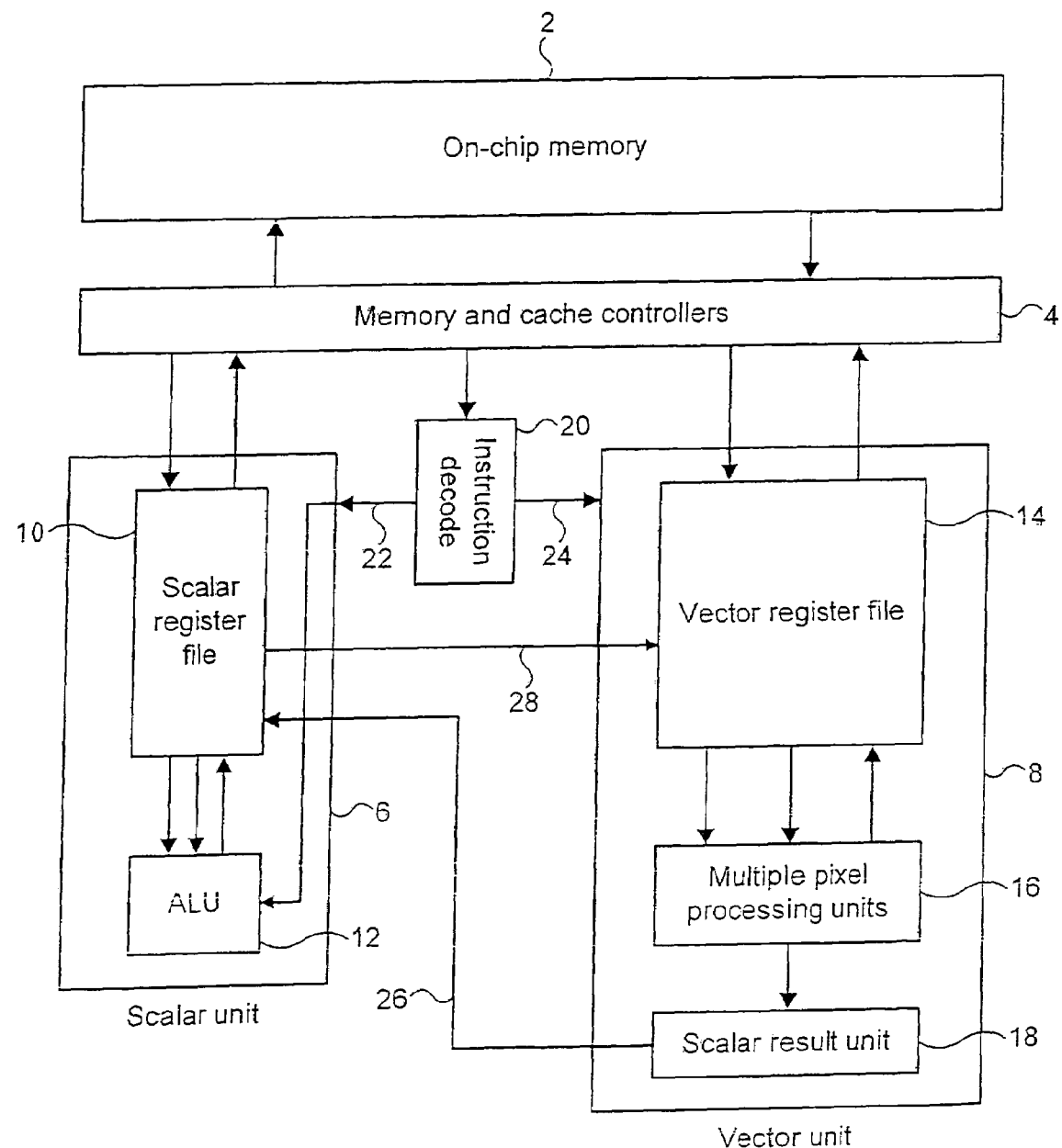
FIG. 1 is a schematic block diagram of the processor architecture.

FIG. 1 is a schematic block diagram of a processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the instruction stream comprises distinct scalar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28.

FIG. 1 is a schematic view only, as will be apparent from the more detailed discussion which follows. In particular, the processor includes an instruction cache and a data cache which are not shown in FIG. 1 but which are shown in subsequent figures. Moreover, the instruction decoder 20 (as described later) in fact lies within the scalar unit.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20 (implemented as a control and Instruction decode module in the scalar unit). Instructions are dispatched sequentially to either the scalar unit 6 (in fact to the ALU processing unit 12 of the scalar unit 6) or to the vector unit 8, depending on their encodings, where they run to completion as single atomic units. That is, the control and instruction decode module 20 within the scalar unit 6 waits for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

Figure 2:
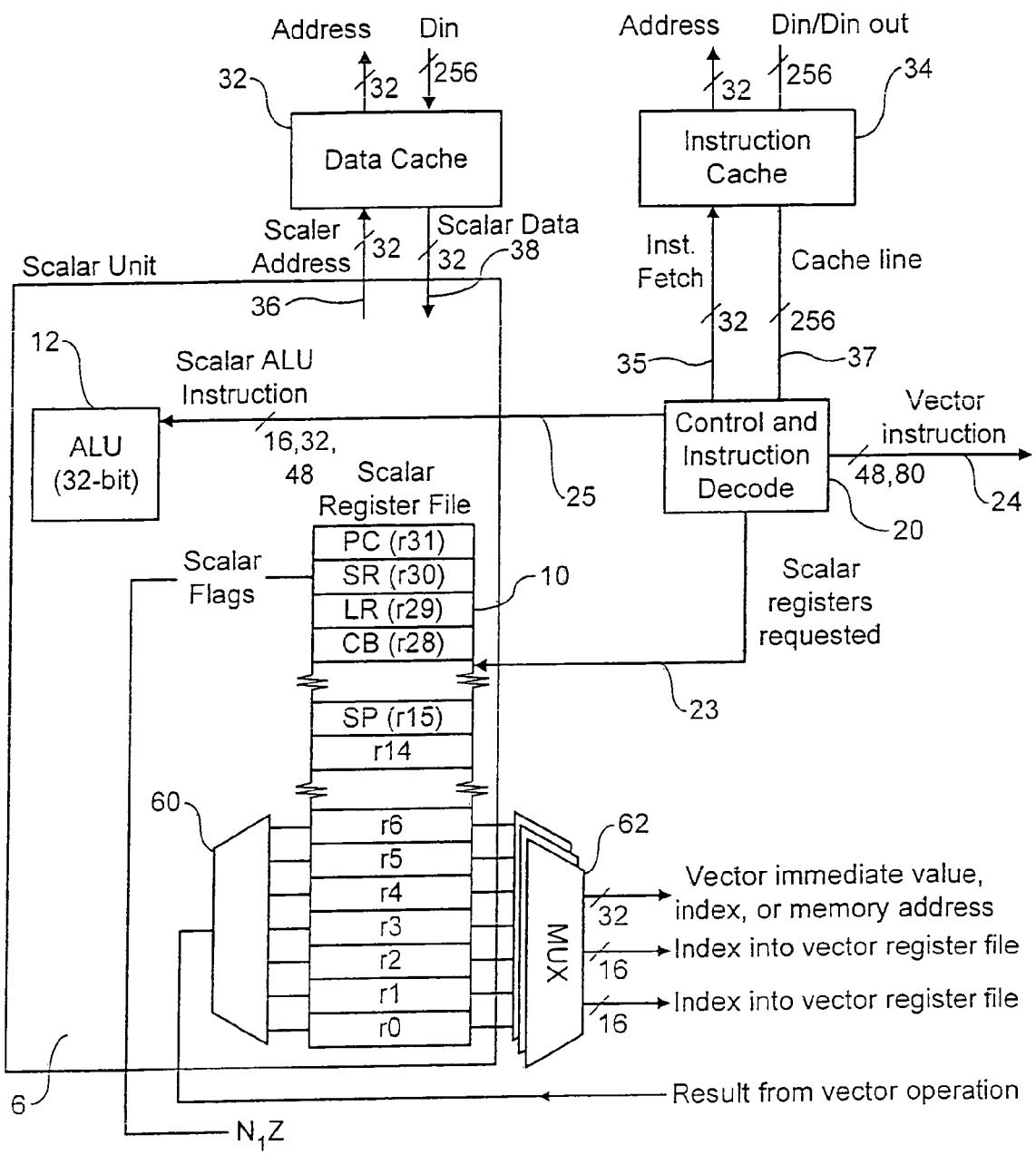
FIG. 2 is a schematic diagram of the scalar unit.

The scalar unit will now be described with reference to FIG. 2. As mentioned above, the instruction decoder 20 is implemented as a control and instruction decode module. The scalar unit communicates with an instruction cache 32 and a data cache 34. In particular, the control and instruction decode module 20 Issues instruction fetches along bus 36 and receives instructions along instruction cache line 38. A 256-bit sequence is received along cache line 38 for each instruction fetch, the number of instructions in each fetch depending on their encodings. Scalar addresses are supplied to the data cache 34 via bus 35 and data returned along bus 37. The control and instruction decode module 20 supplies scalar instructions along path 23 to the ALU block 12 and vector instructions to the vector unit 8 along instruction path 24. The decision as to where to route an instruction is based on the instruction encodings as will be discussed in more detail in the following.

The scalar unit 6 also incorporates a scalar register file. There are thirty-two 32-bit registers which are labelled $r_0 \ldots r_{31}$ in the scalar register file 10. The bottom sixteen registers $r_0$ to $r_{15}$ form the main working registers of the processor, accessible by all but a few specialised instructions. A subset of these working registers, the so-called core registers labelled $r_0$ to $r_6$, are available to the vector unit 8. These registers can be used to hold an immediate value, as an index into the vector register file, as an address for vector memory accesses or for storing results of vector operations.

The function of the other registers is not material to the present invention and is therefore not discussed further herein. It is however pointed out that one of the registers, $r_{31}$ constitutes the program counter which points to the address of the current instruction and thus is used to control instruction fetches. The scalar instruction set uses a standard encoding of 16 bits, with 32 bit and 48 bit variants to cater for large immediate and offset values. The instructions are grouped according to their register usage. That is, there are three groups labelled Group 1, Group 2 and Group 3.

Group 1 instructions comprises general purpose and single register scalar instructions which operate over the full register range, reading and writing to any of the scalar registers $r_0$ to $r_{30}$. Note that to simplify the control logic and avoid future pipeline constraints, the program counter PC ($r_{31}$) is only accessible to move and branch instructions. Instructions that fall into this group are:

| | | | | | |
|---|---|---|---|---|---|
| btest | Rd,#u5 | add | Rd,Ra | | |
| bmask | Rd,#u5 | sub | Rd,Ra | | |
| mov | Rd,#u32 | and | Rd,Ra | | |
| cmp | Rd,#s18 | or | Rd,Ra | | |
| add | Rd,#s18 | asr | Rd,Ra | | |
| sub | Rd,#b3 | shl | Rd,Ra | | |
| asr | Rd,#u5 | cmp | Rd,Ra | | |
| shl | Rd,#u5 | mov | Rd,Ra | | |
| brev | Rd | mov | Rd,pc | | |
| count | Rd | b | Ra | (mov pc,Ra) | |
| abs | Rd | | | | |
| Rd,Ra = r0 ... r30 | | | | | |

Group 2 instructions operate on the so-called working registers $r_0$ to $r_{15}$ of the register file 10. The instructions that fall into this category are:

| | | | |
|---|---|---|---|
| addc | Rd,Ra | mul | Rd,Ra |
| subc | Rd,Ra | max | Rd,Ra |
| rsub | Rd,Ra | min | Rd,Ra |
| neg | Rd,Ra | ld | Rd, (Ra) |
| eor | Rd,Ra | st | Rd, (Ra) |
| not | Rd,Ra | ld | Rd, ([−Ra/Ra++]) |
| lsr | Rd,Ra | st | Rd,([−Ra/Ra++]) |
| ror | Rd,Ra | mla | r0,Ra,Rb |
| btest | Rd,Ra | addscale | Rd,Ra shl #n2 |
| bmask | Rd,Ra | signexth | Rd,Ra |
| | | signextb | Rd,Ra |
| | | addcmpbCond | Rd,[Ra/#s4[,Rb,#s10h |
| | | addcmpbCond | Rd,[Ra/#s4],#u6,#s8h |
| Rd,Ra,Rb = r0 ... r15 | | | |

Group 3 instructions comprises the least frequently used instructions which operate only on the so-called core registers $r_0$ to $r_6$. The instructions that fall into this category are:

| | | | |
|---|---|---|---|
| add | Rd,Ra,Rb | mulhd.ss | Rd,Ra |
| sub | Rd,Ra,Rb | mulhd.su | Rd,Ra |
| asr | Rd,Ra,Rb | mulhd.us | Rd,Ra |
| shl | Rd,Ra,Rb | mulhd.uu | Rd,Ra |
| Rd,Rb,Ra = r0 ... r6 | | | |

Figure 3:
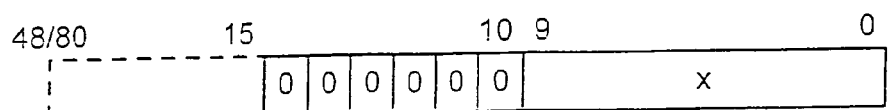
FIG. 3 illustrates bits 0 to 15 of a vector instruction.

FIG. 3 illustrates bits 0 to 16 of a vector instruction. Of particular importance, it is to be noted that the 6 bit sequence 000000 in bits 10 to 15 of the instruction indicate that the instruction is not a scalar instruction but is in fact a vector instruction. This allows the instruction decoder 20 to distinguish between scalar instructions and vector instructions. Vector instructions are described in more detail later.

The vector unit 8 will now be described with reference to FIG. 4. The vector unit comprises sixteen 16 bit pixel processing units $PPU_0$ ... $PPU_{15}$ which operate in parallel on two sets of sixteen values. These sets of values can be retrieved as packed operands from the vector register file 14, from the scalar register file 10 or from the main memory 2. The results of the PPU operations are handled as described later.

The detail of the vector register file 14 is not germane to the present invention and therefore is not described in detail herein. However, it is to be noted that groups of sixteen contiguous pixels are written or read at once, each pixel value being represented originally by an 8-bit or 16-bit sequence.

Figure 5:
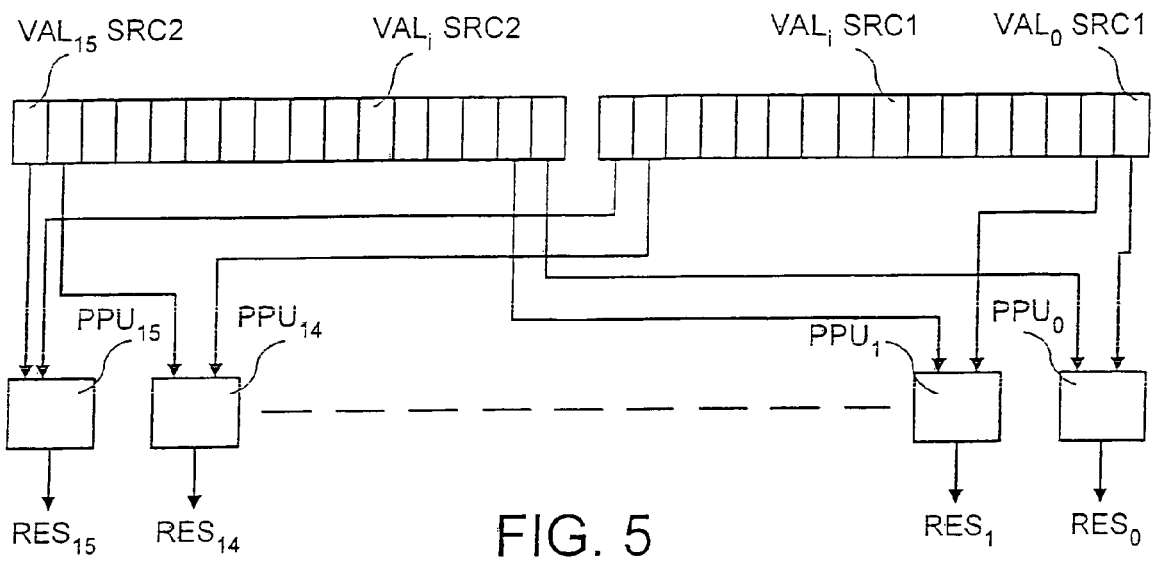
FIG. 5 is a schematic diagram illustrating parallel operation of multiple pixel processing units in the vector unit.

As illustrated in FIG. 5, each pixel processing unit PPUi acts on two values. When the processor is a graphics processor, each value relates to a pixel. The vector instructions supply two operands to the pixel processing unit. These are labelled SRC1, denoting a first packed operand and SRC2, denoting a second packed operand in FIG. 5. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 5.

The pixel processing units $PPU_0$ ... $PPU_{15}$ will now be described with reference to FIG. 6. Each of the pixel processing units contains an ALU 50 which operates on two input 16-bit values VAL; SRC1, VAL; SRC2 supplied along paths 52, 54 respectively, to port A and port Op2 to create a single output value $RES_{out}$, according to the operation that has been selected by the vector instruction. Each pixel processing unit 16 has Z, N and C flags denoted generally by the flag block 56. The Z flag denotes a zero flag, the N flag denotes a negative flag and the C flag is a carry flag. The function of these flags is not germane to this invention and is not described further herein. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18. It will be clear from this that a vector instruction can have two "destinations", one being the VRF where PPU results are returned and the other being the SRF where the result of the SRU operation is returned. In particular, the values that emerge from the PPUs are in essence always fed both back to the VRF and the SRU. There are just a few qualifications, including the possibility that the destination register of a vector instruction my be given as "-" meaning "do not write the result back". In this case, no values are returned to the VRF. The values are still passed on to the SRU as usual, however.

The scalar result unit 18 operates on the outputs of the pixel processing unit 16, depending on the operation defined in the vector instruction supplied to the vector unit. This value is then written back to the scalar register file 10 in the scalar unit 6 and the scalar flags N, Z are updated according to it. A demultiplexer 60 (FIG. 4) in the scalar unit 6 writes the value to the correct one of the core registers $r_0$ ... $r_6$. Likewise, a set of multiplexers 62 supply the outputs of the core registers $r_0$ ... $r_6$ to the vector register file via address calculation logic 64 according to whether the value is a vector immediate value, index or memory address of 32 bits, or respective 16 bit indices into the vector register file.

Values can be supplied to the pixel processing units 16 in a number of different ways. The use of a 16 bit index creates an address via address calculation logic 64A into the vector register file into the port marked $A_{addr}$. This causes data held in the vector register file to be supplied to the pixel processing units 16 into port A along path 52 in FIGS. 4 and 5. Data can also be accessed from port B by using an index which has created an address for the vector register file into the port marked $B_{addr}$.

This data can be supplied to the port Op2 of the pixel processing unit 16 via a multiplexer 64. Multiplexer 64 also allows for data to be accessed directly from the scalar register file 10 by taking a value held in one of the core registers $r_0$ ... $r_6$ and supplying it through a replicate unit 66, which replicates it 16 times.

Figure 4:
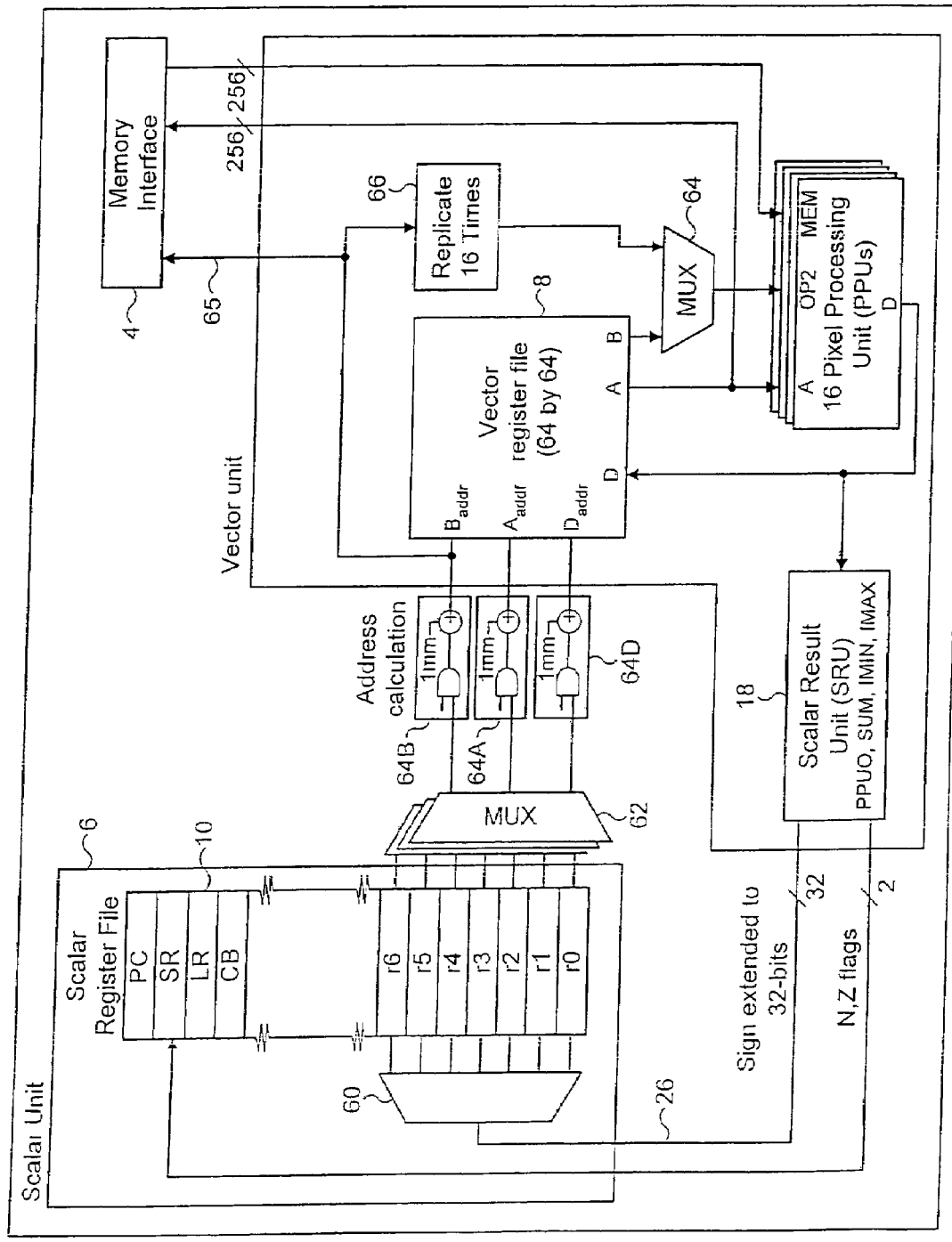
FIG. 4 is a schematic block diagram of a vector unit.

An alternative supply of data to the pixel processing unit 16 is directly from on-chip memory 2 via the memory interface 4 (FIG. 4). In this case, an address calculated by address calculation logic 64B is used as an address into main memory along address bus 65, and data access thereby is supplied to port MEM of the pixel processing unit.

The replicate unit 66 can also act on an immediate value in a vector instruction as well as on the contents of a core register in the scalar register file 10.

Figure 6:
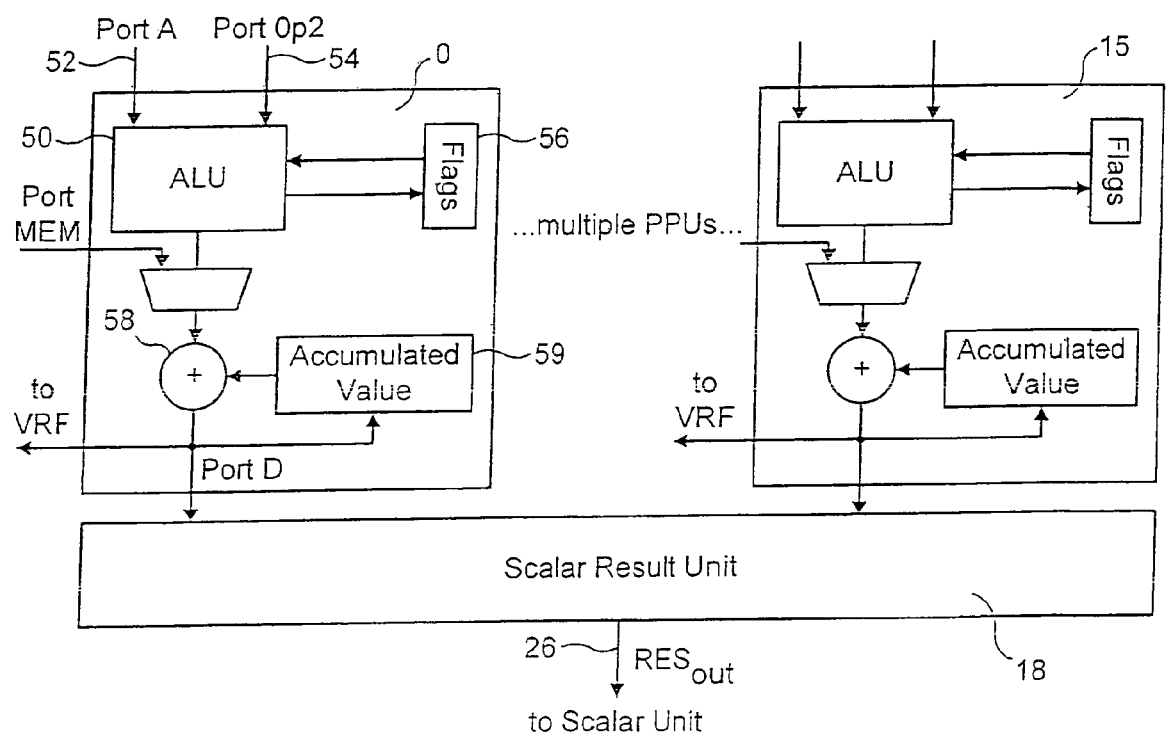
FIG. 6 is a schematic diagram illustrating the internal circuitry of pixel processing units.

From this discussion it will be appreciated that the input labelled 54 in FIG. 6 to the pixel processing units can supply either values from the vector register file, values from the scalar register file or values directly from memory to the ALU.

With a small number of exceptions, almost all vector instructions have a general three operand form:

<operation> R(yd,xd), R(ya,xa), Op2[<modifiers>]

where operation is the name of the operation to be performed, and registers in the vector register file are generically denoted R(y,x) due to the addressing semantics of the vector register file (not discussed herein). In the above example R(yd,xd) is the destination register, R(ya,xa) is the first source register and Op2 may indicate a second source register R(yb,xb), or a value taken from one of the scalar registers $r_0$ to $r_6$, or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU. The following description discusses a modifier which affects the PPUs and modifiers which affect the scalar result unit.

Once such modifier affecting the PPU is the "accumulate" modifier ACC. This modifier instructs the pixel processing unit 16 to add the result of the ALU operation to the current value of the accumulator 59. This addition is always performed using 16 bit signed saturating arithmetic. When the "accumulate" modifier ACC is specified, then the accumulated value, not the output of the ALU; becomes the final output read by the pixel processing unit. This means that the accumulated value will be written back to the destination register at port D.

The vector instructions operate on the pixel processing unit 16 in the following way.

Each of the sixteen pixel processing units is presented with two 16-bit values, one derived from R(ya,xa) and one derived from Op2. (Note that if 8-bit values are read from the vector register file then these are zero extended into 16-bit values.)

Each pixel processing unit performs its operation in accordance with the nature of the operation defined in the instruction. The operation is executed by the ALU 50.

If an instruction modifier specifies accumulation of the results, then this takes place. In this case the accumulated values are returned as the final output values of the pixel processing units 16, otherwise the output of the ALU operation is returned as the final output of the pixel processing unit. The scalar result unit 18 performs any calculations indicated by modifiers. The scalar result unit operates on the final outputs from the pixel processing units 16 and the result may be written to one of the scalar registers $r_0$ to $r_6$, and the scalar flags will be set accordingly. The final outputs of the pixel processing units are also written back to the vector register file at port D (in FIGS. 4 and 6).

The vector instruction set can be thought of as being constituted by four types of instructions:
  load/store instructions
  move instruction
  data processing instructions
  look up instructions.

It is to be noted that in writing the program, all vector instructions are preceded by v to denote that they are vector instructions. In the encoding, bits 10 to 15 are set to zero so that the fact that they are vector instructions can be recognised by the instruction decoder. Each instruction type has an 80-bit full encoding, and common types have a compact 48-bit encoding. By way of example, FIG. 6 illustrates the compact 48-bit encoding and full 80-bit encodings for data processing Instructions of the following form:

<operation> R(yd,xd),R(ya,xa),Op2.

Note that all instructions contain six bits to hold opcode identifying the nature of the instruction (bits 328 of half-word 0, labelled L[0] to L[5]). These bits are supplied to each of the PPU's 16. Also note that bit 9 labelled CMPT is a flag which is set to one to indicate a compact 48-bit encoding and 0 to indicate the full 80-bit encoding. Then there is a input D which is as follows:

The main categories of vector instructions are discussed below.

Load/Store Instructions vld R(yd,xd). (rx+#immediate)

Load sixteen consecutive bytes or sixteen bit half words from memory into the vector register file.

The load instructions identify a destination register in the vector register file and identify a source operand by virtue of its address in main memory. Its address in main memory is calculated from the content of a register rx in the scaler register file 10 using the address calculation logic 64$_B$ and the resulting operand is supplied to port MEM.

The store instructions identify a set of operands in the vector register file and cause them to be stored back to memory at an address identified using the contents of a scalar register. The instruction has the following format:

vst R(ya,xa), (rx+#immediate).

Store sixteen consecutive bytes or half words from the VRF back to memory. The memory address is calculated using the address calculation logic 64$_B$ as before.

In both cases, if R(y,x) denotes an 8-bit register, sixteen bytes are stored. If R(y,x) denotes a 16-bit register, half words are stored.

Move Instructions vmov R(yd,xd), Op2 moves OP2to R(yd,xd).

In this case, Op2 may be a value from a scalar Register rx, or an immediate value or an immediate value plus the value from a scalar register rx, or a VRF register R(yb,xb) accessed from port B in FIG. 4. In this case therefore there are a number of options for identifying the location of the source value, the destination location being identified in the vector register file.

Data Processing Instructions

All these instructions take the usual form:

<operation> R(yd,xd) R(ya,xa) Op2.

A number of different operations can be specified, including addition, subtraction, maximum, minimum, multiply, etc.

Look-up instructions are specialised instructions having the form:

vlookup R (yd,xd)

and are not discussed further herein. They allow access to the vector register file, the addressing semantics of which are not discussed further herein.

As mentioned above, the scalar result unit 18 can implement different operations as defined by modifiers in the vector instructions.

The SRU 18 calculates a 32-bit value from the 16 PPU outputs and writes this result back to one of the scalar registers r0 to r6, denoted by rx. The scalar unit N and Z flags are both updated by this process, with the C and V flags left unaffected. The modifiers that apply to the SRU are given in Table I.

TABLE I

| Modifier | Description |
| --- | --- |
| PPU0 rx | Place the output of $PPU_0$ into register rx |
| SUM rx | Sum all PPU outputs and place the result in rx |
| IMIN rx | Place the index (0 . . . 15) of the minimum PPU output in rx |
| IMAX rx | Place the index (0 . . . 15) of the maximum PPU output in rx |

PPU0

The output of the first PPU ($PPU_0$) is placed into scalar register rx, and the scalar flags updated accordingly.

SUM

All active PPUs are summed and the result placed in rx, updating the scalar flags accordingly. If no PPUs are selected, then the result is always zero.

IMIN

The index i (running from 0 to 15) of $PPU_i$ that contains the minimum value of any active PPUs is placed in rx, and the scalar flags updated. If no PPUs are active, then the result is −1. If two or more PPUs share the same minimum, the lowest valued index is returned.

IMAX

The index I of $PPU_i$ that contains the maximum value of any active PPUs is placed in rex, and the scalar flags updated. If no PPUs are active, then the result is −1. If two or more PPUs share the same maximum, the highest valued index is returned.

None of these SRU modifiers can be mixed with one another.

As noted above the core processor has a separate instruction cache 32 and data cache 34. The instruction cache may be a read-through 32K bit direct-mapped cache, organised as 128 lines of 256 bits. Cache lines are read from memory 256-bits at a time, and then accessed by the scalar unit as 16/32/48/80-bit instructions. A simply look-ahead mechanism pre-loads the cache line of the next instruction by assuming that instructions are read sequentially. Loops and sequential accesses will therefore normally result in a cache hit (the former because the earlier instructions should still reside in the cache) with forward branches incurring a cache miss penalty as the new line is fetched from memory. The instruction cache can be flushed via a memory-mapped control register in the I-O space.

The data cache operation may be slightly different as it may be both write-back and has multiple bus masters. The data cache is a read-throught write-back 16K byte direct-mapped cache organised as 64 lines of 128 bits by two. Each line of the cache can be written back as two independent 128-bit writes, but is always read from memory in a single 256-bit operation. The data cache operation is described further herein below in relation to narrow and wide data transfers.

Figure 8:
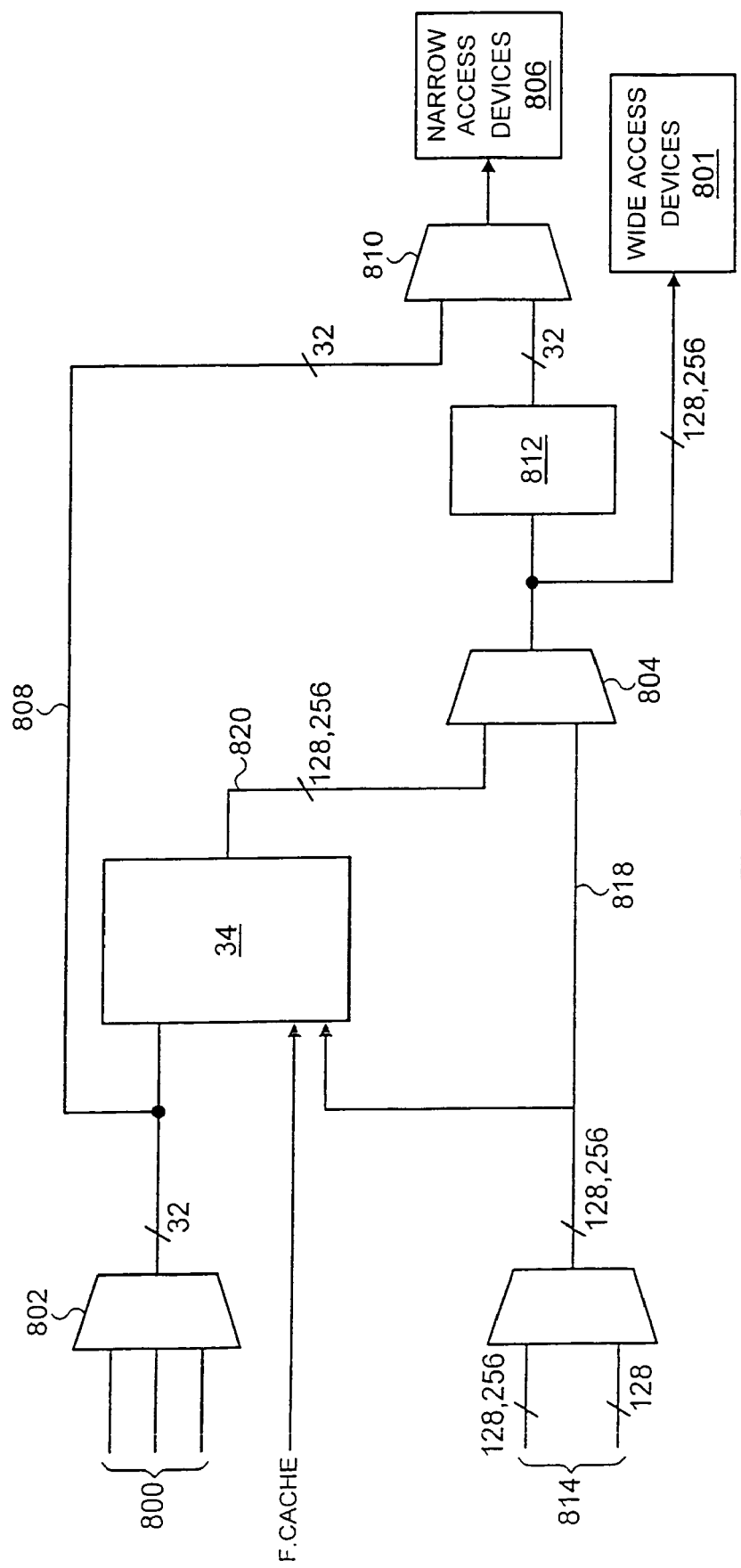
FIG. 8 illustrates a data translation mechanism.

A memory-mapped control register in I/O space defines the data cacheable address space, and initiates data and instruction cache flush action. Both the data and instruction caches are cleared on reset, and likewise both should be flushed after downloading new program codes. FIG. 8 illustrates how narrow and wide data transfers can be distinguished in order to improve performance in the above-described core processor.

Narrow data transfers are defined as 8, 16 or 32 bit transfers in parallel. The wide transfers are defined as 128 or 256 bit parallel data transfers. It will be understood that the terms wide and narrow are not to be restricted to the specific numbers of bits. Rather any distinction may be drawn between data transfers comprising relatively large number of bits in parallel and transfer of relatively few bits. The vector unit and on-core SRAM support wide data transfer, whereas the scalar unit 6 and peripherals support narrow data transfers. In particular FIG. 8 shows a simplified block diagram of the data translation mechanism employed between narrow/wide bus masters and narrow/wide access devices.

Narrow bus masters 800 such as the scalar unit 6, host or debug controllers always access the wide access devices 801 through the data cache via multiplexor 802, data cache 34 and multiplexor 804.

The DMA controller is used to transfer data between peripherals and memory, independently of the vector and scalar processing unit. The DMA controller has a number of memory-mapped registers accessible in the I/O space. All DMA transfers take place in units of 128 bits.

The host interface is capable of acting as a bus master and directly writing to anywhere in the 32-bit address space. The functionality of the host interface is partitioned between the interface peripheral, which connects to the external world, and the interface controller embedded within the memory controller. The host talks to the host interface peripheral, which in turn talks to the host interface controller within the memory controller.

The access mechanism by which narrow bus masters 800 always access the wide access devices 801 through the data cache means that the data translation mechanism automatically translates 8/16/32-bits requests into 128/256-bit data transfers in the course of the normal data cache operation. A 32-bit read from SRAM (a wide access device) will either return the data from cache or result in a cache line fetch to read a new 256-bit cache line. Writing a 32-bit value to SRAM will likewise either result in updating the data in cache-line (if it is already cached) or conversely result in a SRAM read to first retrieve the line from SRAM before updating it in the cache. The cache line is marked as dirty to indicate that it has been changed, and will only be physically written back to the SRAM when the cache line is required for a new cache operation or the cache is flushed.

Narrow bus masters 800 have two routes to the narrow access devices 806. They can either access the device directly via line 808 and multiplexor 810, or via the cache 34. The choice of route is determined by a memory mapped register in the processor core I/O space which allows the user to mark a segment within the peripheral address space as being cached or uncached. Generally I/O and non-memory peripherals will normally be uncached, where as memory based peripherals (such as external SDRAM) will normally be cached. Cached accesses use the same scheme outlined above for wide access devices, except that the data passes through a block assembly/disassembly unit 812 to convert the wide cache lines from/to narrower peripheral accesses.

Wide bus master 814 data transfers are never cached. However as the data may already be in the cache as a result of a scalar unit operation, the cache must still be checked to maintain consistency between the read/write operation. A wide data write guarantees data consistency by invalidating any cache-line that corresponds to the same address as the data being written. The cache line can be invalidated in parallel to the write operation allowing both to be completed in a single cycle (when accessing on-core SRAM). A wide data read is slightly more complex. The device is always read, and at the same time the cache checked to see if the data is cached. If the data is in the cache and marked as dirty (ie. it has been altered but not yet written back), then the data is taken from the cache instead of the device. This guarantees data consistency, but does mean that an additional cycle is required whenever the data has to be taken from the cache A wide bus master can read/write directly to a wide access device, and uses the block assembly/disassembly unit when accessing narrower peripheral data. In both cases the cache is checked to achieve data consistency as described above.

The data cache 34 maybe arranged to received a flush cached signal F.CACHE. It will also be understood that bits from the address (to which data is being written) are forwarded to the data cache which if it finds a line in the cache corresponding to that address, invalidates it.

Wide accesses are thus only read from the cache if data is cached and the cache line is dirty. This is output via line 816 onto signal line 818. This may be done by a multiplexor which switches its output between the lines from the cache 816 and the lines from the device 801 according to whether the requested data address is found to be present in the data cache. The signal on line 818 is input into multiplexor 804 which selects this or the output from the data cache, on signal line 820 which is output when a cache line fetch or write-back occurs.

It will be understood that the data cache only contains wide data records. When a narrow record is requested, the cache is checked. If the wide record that contains it is there, then it is returned, otherwise that wide record is fetched from the device and placed in the cache, and the appropriate piece of narrow data returned. Requests for wide data records goes straight to the device itself. However, the cache is also checked, and returned from there if it is both present and marked as dirty. Writing a narrow data record updates the cache, and flags the wide data record in the cache as dirty, writing a wide data record goes straight to the device but the cache is checked and if found the record there is invalidated.

It should be noted that whilst the above describes preferred embodiments of the invention variations and modifications may be made without departing from the scope of the present invention.

The invention claimed is:

1. An integrated circuit comprising:
   a first circuit for supporting a write operation;
   a second circuit for supporting a read operation;
   a data cache for supporting data reception when a cache line is valid, wherein the data cache comprises a plurality of memory elements; and
   an interface for transferring data to the second circuit from the first circuit and simultaneously invalidating the cache line to prevent transferring data to the data cache, wherein transferred data is read by the second circuit and written from the first circuit when it is not identified as dirty data.

2. The integrated circuit in claim 1, wherein data is stored in the first circuit as wide data.

3. The integrated circuit in claim 2, wherein data is stored in the second circuit as narrow data.

4. The integrated circuit in claim 3, wherein the interface further comprises a block conversion unit for converting transferred data from wide data to narrow data when transferred data is received by the second circuit.

5. The integrated circuit in claim 3, wherein the first circuit further supports data reception.

6. The integrated circuit in claim 5, wherein the second circuit further supports data transfer.

7. The integrated circuit in claim 6, wherein the interface further comprises a block conversion unit for converting transferred data from narrow data to wide data when transferred data is received by the first circuit.

8. The integrated circuit in claim 1, wherein the cache line corresponds to a data address.

9. An integrated circuit comprising:
   a first circuit for supporting a write operation;
   a second circuit for supporting a read operation;
   a data cache for storing data when a cache line is valid, wherein the data cache comprises a plurality of memory elements, wherein transferred data is received by the data cache from the first circuit; and
   an interface for transferring data from the first circuit to the second circuit and simultaneously invalidating the cache line to prevent transferring data to the data cache.

10. The integrated circuit in claim 9, wherein the first circuit further supports the read operation.

11. The integrated circuit in claim 10, wherein the second circuit further supports the write operation.

12. The integrated circuit in claim 9, wherein transferred data is stored in the data cache and marked as dirty data.

13. The integrated circuit in claim 9, wherein transferred data is read by the second circuit from the data cache when it is identified, by address, as data from the first circuit.

14. The integrated circuit in claim 9, wherein transferred data is read by the second circuit from the data cache when it is identified as dirty data.

15. The integrated circuit in claim 9, wherein transferred data is read by the second circuit and written from the first circuit when it is not identified as dirty data.

16. The integrated circuit in claim 9, wherein transferred data is storable in the data cache when an address associated with the transferred data is identified in a register arranged to store records of cacheable data.

17. The integrated circuit in claim 16, wherein non-cacheable data is transferred between the first circuit and second circuit without accessing the data cache.

18. The integrated circuit in claim 16, wherein cacheable data is transferred between the first circuit and second circuit via the data cache.

19. The integrated circuit in claim 9, wherein a block of wide data is stored as a line in the data cache.

* * * * *